Aug. 20, 1968  C. R. ELLIS  3,397,608

DISPLACEMENT SENSING DEVICE

Filed March 3, 1964  2 Sheets—Sheet 1

INVENTOR.
C. R. ELLIS
BY Peter F. Willig
ATTORNEY

Aug. 20, 1968   C. R. ELLIS   3,397,608
DISPLACEMENT SENSING DEVICE
Filed March 3, 1964   2 Sheets-Sheet 2

INVENTOR.
C. R. ELLIS
BY
ATTORNEY

United States Patent Office 3,397,608
Patented Aug. 20, 1968

3,397,608
DISPLACEMENT SENSING DEVICE
Charles R. Ellis, Newton, Mass., assignor to Keuffel &
Esser Company, Hoboken, N.J., a corporation of New
Jersey
Filed Mar. 3, 1964, Ser. No. 349,076
7 Claims. (Cl. 88—14)

ABSTRACT OF THE DISCLOSURE

A device for measuring displacement between two bodies relative to a beam of light extending between the bodies in which the displacement is measured transversely to the beam of light by means of a beam of collimated light having at least two sharply divided polarized beam sectors with each beam sector having a distinctively different polarization characteristic from the other beam sectors and passing such beam of polarized light through an analyzer including a pair of screens in the path of the beam of light which screens prevent the passage of a particular polarized beam sector while permitting the passage of a different polarized beam sector and measuring the amount of light passing through such screens to thereby determine the lateral displacement. The device may also include electronic autocollimating sensors which measure angular rotation about two mutually perpendicular axes which are generally perpendicular to the beam of polarized light.

---

The present invention relates to displacement determination, and refers more particularly to systems and devices for sensing displacement with respect to a light beam.

Displacements of a body in a plane perpendicular to the axis of a light beam have been difficult to determine. Displacements of a body along two perpendicular axes orthogonal to the axis of a light beam have been determined, but the simultaneous determination of biaxial rotations, and displacements within a plane perpendicular to the axis of a light beam has not been accomplished.

The present invention provides a system and device for sensing displacements of a body in a plane perpendicular to the axis of a light beam and biaxial rotations of the same body with respect to the same light beam. Information thus gained may be used for recording or monitoring purposes.

One object of the present invention is to provide a system and device for sensing displacements of a body in a plane perpendicular to the axis of a light beam.

Another object is to provide a system and device for sensing biaxial displacements of a body with respect to the axis of a light beam.

Another object is to provide a system and device for simultaneously sensing biaxial rotations with respect to the axis of a light beam and biaxial displacements of the same body in a plane perpendicular to the same light beam.

Another object is to provide a system and device for generating signals for recording and monitoring displacements of a body with respect to a light beam.

Other objects will become apparent in the course of the following specification.

The objects of the present invention may be realized by providing means for producing a light beam having sharply divided cross-sectional regions or sectors of distinctly differently polarized light, and analyzing means optically aligned with said beam-producing means for producing a signal corresponding in intensity of each polarized region of said beam. Relative displacement of the beam-producing means with respect to the analyzing means may be sensed. The signals generated by the analyzing means are used in recording means for presenting the displacement in graphic form or in monitoring means for correcting the relative displacements.

The present invention will appear more clearly from the following detailed description when taken in connection with the accompanying drawings showing, by way of example, preferred embodiments of the inventive idea.

Figure 1:
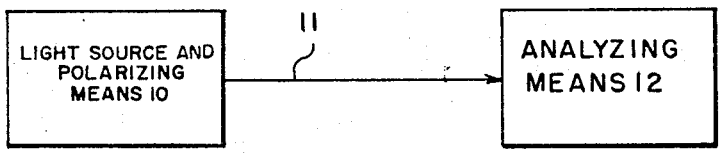
FIGURE 1 shows one displacing sensing system of the present invention.

In FIGURE 1, system of the present invention comprises means 10 providing a light source and means to produce a beam having a plurality of sharply divided regions of polarized light and for directing a beam 11 having sharply divided regions of differently polarized light to polarization analyzing means 12 optically aligned with means 10. The cross-sectional regions of beam 11 are sharply delineated into sectors of distinctly different polarized light. For example, beam 11 may be sharply divided into a half beam sector which is vertically polarized and a half beam sector which is horizontally polarized. When analyzing means 12 is perfectly aligned with beam 11, each half in turn is sensed equally and signals of equal intensity are generated. These signals may be paired and balanced electronically to produce a null reference signal for recording or monitoring purposes. When beam-producing means 10 is displaced relative to analyzing means 12, one half beam sector of beam 11 is sensed more than the other half beam sector and the disparity produces a difference between the intensities of the signals. The magnitude and polarity of the difference indicates the magnitude and direction of the displacement.

Beam 11 may be sharply divided into upper and lower half beam sectors for sensing vertical displacement, or into left and right half for sensing horizontal displacements. Other displacements may be sensed by rotation of beam 11 about its axis, or by aiming means 10 in a particular direction and aligning analyzing means 12 with beam 11.

Beam 11 may also be sharply quartered in cross-section with each quadrant beam sector having a different and identifiable polarization of light. The quadrants are paired diagonally so that analyzing means 12 may sense biaxial displacement in a plane perpendicular to the axis of beam 11. When analyzing means 12 is coupled orthogonally about its optical axis with two electronic auto-collimators, biaxial rotation or tilt of the plane with respect to beam 11 may be sensed. That is, assuming that the light beam coincides with the Z-axis, rotation of the beam about the X- and Y-axes may be sensed together with intraplanar displacement in the X–Y plane.

Figure 2:
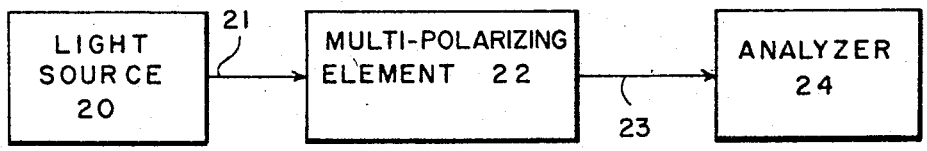
FIGURE 2 shows another system.

The FIGURE 2, system of the present invention comprises a light source 20, a multipolarizing element 22, and a polarization analyzer 24. Light beam 21 from source 20 is directed to multipolarizing element 22 where it is transformed into beam 23 having sharply defined regions or beam sectors, each having a different and identifiable polarization of light. Each region or sector of multipolarized beam 23 is then sensed by polarization analyzer 24 as in the system of FIGURE 1 above.

Multipolarizing element 22 is sharply divided into a plurality of differently polarizing parts which are all transmitting or reflective. When all the parts are reflective, analyzer 24 and source 20 may be combined into one unit and element 22 mounted on a displaceable body for sensing. When the upper half of element 22 vertically polarizes light and the lower half horizontally polarizes light, beam 23 has a cross-section with an upper half beam sector comprising vertically polarized light and a lower half beam sector comprising horizontally polarized light.

Another embodiment of element 22 is divided into quadrants transmitting or reflecting a different polarization of light. One quadrant produces vertically polarized light, a second produces horizontally polarized light, a third produces right circularly polarized light, and the fourth produces left circularly polarized light. The quadrants are preferably paired to permit analyzer 24 to sense biaxial displacement of the body to which element 22 is mounted.

Figure 3:
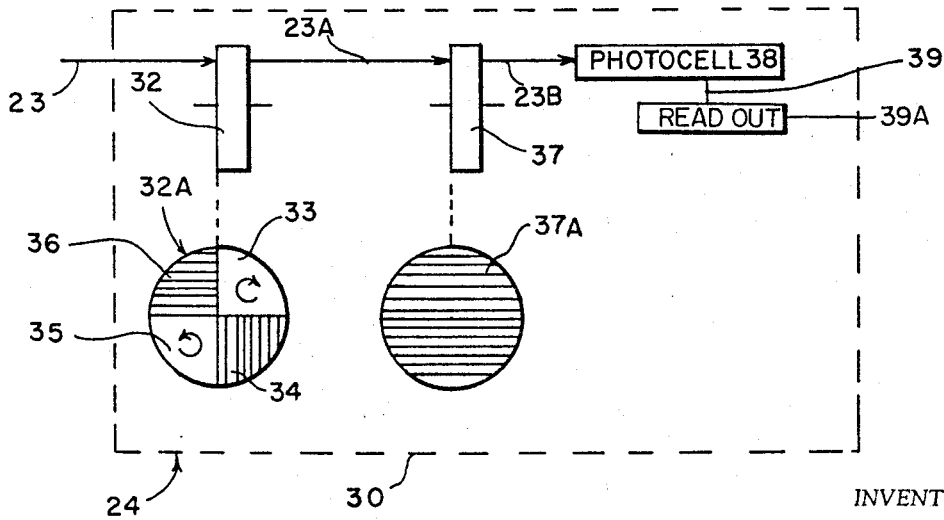
FIGURE 3 is a schematic diagram of a polarization analyzer.

In FIGURE 3, a polarization analyzer 24 of the present invention comprises a housing 30 within which is mounted rotatable screen elements 32 and 37, driving means (not shown), and photocell 38. Screen element 32 is a polarization analyzer for screening incident beam 23. A front view of element 32 is shown as 32A with four differently analyzing quadrants, only one of which is used at a time. Element 32 makes periodic 90° rotations in a step-wise manner and thus presents each quadrant in sequence to the incident beam 23 for a definite period of time. When beam 23 comprises four sharply-divided polarized regions or sectors in cross-section, each of the four regions is sensed in turn. Thus incident beam 23 strikes element 32 in one quadrant, and depending upon the phase presented, some light passes through as beam 23A.

Quadrant or sector area 33 transforms right circularly polarized light to a first plane polarized light and quadrant 35 transforms left circularly polarized light to a second plane polarized light, the planes being perpendicular to each other. Quadrant 34 transmits only vertically polarized light and quadrant 36 transmits only horizontally polarized light. The planes must be carefully considered, however, since element 32 makes 90° rotations in a step-wise manner. Thus if the incident beam 23 strikes only the upper right quadrant and when quadrant 34 is moved into this position, it transmits only horizontally polarized light, not vertically polarized light. Similarly, quadrant 36, when positioned in the upper right quadrant, transmits only vertically polarized light, not horizontally polarized light.

Since circularly polarized light is a binary compound of two plane polarized componnets, and quadrants 33 and 35 transform the circularly polarized regions to their two-plane polarized components, a second analyzer, element 37, is needed to screen out one component and transmit the other.

The second screen element 37 is optically aligned with the first screen element 32 to receive beam 23A in one quadrant. Element 37 is a plane analyzer having a front view shown as 37A. It is rotatable about the same axis as element 32 and it makes 90° rotatations in a step-wise manner. However, the rates of rotation of element 32 and element 37 are not the same. Element 32 rotaes step-wise at a rate twice as fast as element 37. In other words, element 32 rotates 90° and stops while element 37 remains stationary. When element 32 rotates a second 90° step to its second stop position, element 37 simultaneously rotates 90° to its first stop position. Thus, for each two-step rotation of 90° that element 32 makes, element 37 makes a one-step rotation of 90°.

The two-element screening system precisely and selectively filters incident beam 23 having four sharply-divided, differently-polarized regions to produce an emergent beam 23B having only one plane of polarization. The intensity of beam 23B is sensed by photocell 38 mounted in housing 30 and optically aligned with elements 32 and 37 to receive beam 23B. Photocell 38 generates an electrical signal corresponding in magnitude to the intensity of beam 23B. In this manner a signal is generated for each region of incident beam 23.

Elements 32 and 37 are driven in specific relation to each other by means of driving means mounted within housing 30.

The electrical signals generated by photocell 38 are directed via transmission cable 39 to electronic means read out means 39A for amplifying, storing, comparing and producing output signals usable for recording and monitoring purposes.

The regions or sectors may be paired electronically so that biaxial displacement of the body in a plane perpendicular to the axis of the light beam may be determined. For example, an element 22 having sharply-divided, differently-polarizing, reflective quadrants is suitably mounted on a displaceable body so that reflected beam comprises a top-bottom regional pair for vertical displacement sensing and a left-right regional pair for horizontal displacement sensing. Analyzer 24 is optically aligned with element 22 to sense each region in turn and to generate an electrical signal corresponding in magnitude to the intensity of each region sensed. The difference in magnitude and polarity between paired mates indicates the magnitude and direction of the displacement along one of the vertical or horizontal axes in the plane perpendicular to the axis of the light beam.

Figure 4:
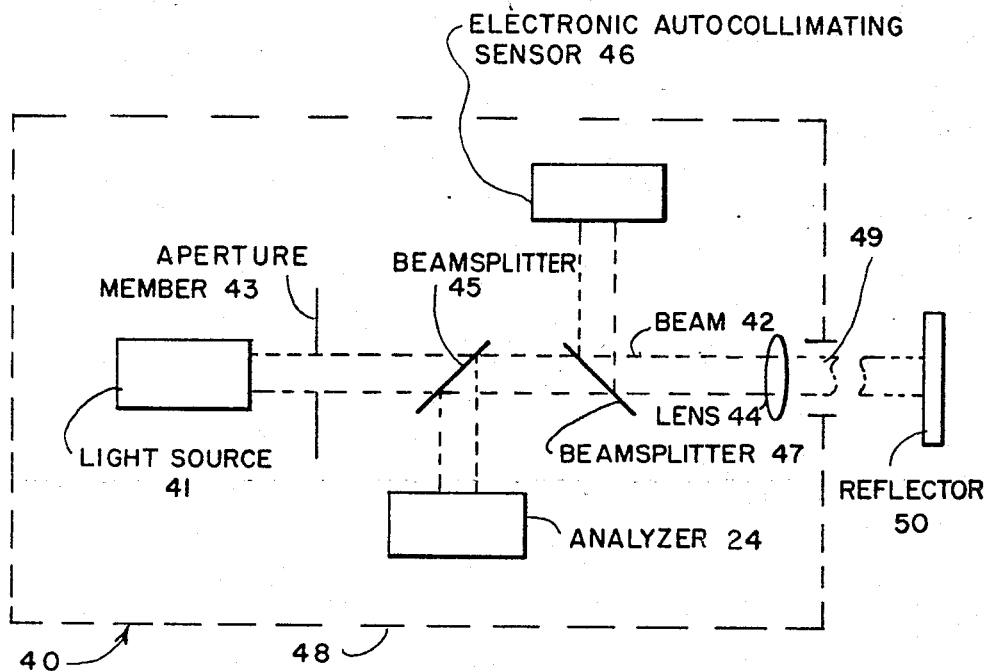
FIGURE 4 shows one embodiment of the displacement sensing device.

In FIGURE 4, a light source and an analyzer are combined into one unit. Embodiment 40 comprises a housing 48 within which is mounted a light source 41, aperture member 43, beam splitter 45, analyzer 24, and collimating lens 44. Light source 41 is suitably mounted to direct a beam 42 of collimated light through aperture member 43, beam splitter 45, and lens 44 through opening 49 to external multiplolarizing reflector 50 mounted on a displaceable body. Aperture member 43 restricts the beam 42 to about one-half its original diameter to provide some latitude for the reflected beam of multipolarized light from reflector 50 on lens 44. The reflected beam is substantially deflected by beam splitter 45 to analyzer 24 where the various regions of the reflected beam are sensed to generate signals for use in recorders or monitors.

Figure 5:
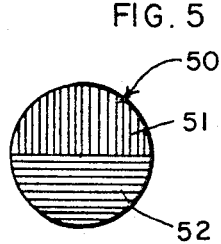
FIGURE 5 is a front view of a multipolarizing reflector.

As shown in FIGURE 5, reflector 50 is divided into two polarizing regions. Upper region 51 is a vertically polarizing reflector and lower region 52 is a horizontally polarizing reflector. The two regions are sharply delineated and the total area is larger than a cross section of beam 42. The two regions may also have a left-right arrangement.

Figure 6:
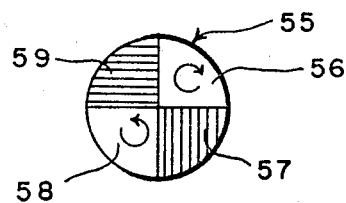
FIGURE 6 is a front view of another multipolarizing reflector.

Another reflector 55 is shown in FIGURE 6 and is divided into quadrants 56, 57, 58, and 59. Quadrant 56 is a right circularly polarizing reflector and quadrant 58 is a left circularly polarizing reflector. Quadrant 57 is a vertically polarizing reflector and quadrant 59 is a horizontally polarizing reflector.

Beam 42 is directed to the dividing line of reflector 50 so that polarization occurs in each beam sector part in equal amounts by reflection, that is, the reflected beam is half vertically polarized and half horizontally polarized. The reflected beam passes through lens 44 to beamsplitter 45 where it is reflected to polarization analyzer 24. The intensity of each region of the dipolarized reflected beam is sensed and a signal is generated. The signal is transmitted to a remote electronic means. When the collimated light beam 42 is centered on a dividing line between the two regions 51 and 52, then each of the two kinds of polarized light is sensed to the same degree of intensity. When beam 42 lies more in one region than in the other, then more of one kind of polarized light is sensed than the other. The corresponding signals indicate this displacement.

An electronic auto-collimating sensor 46 may be mounted in housing 48 and optically aligned with beam 42 by means of beamsplitter 47 to determine tilt of reflector 50 with respect to the axis of beam 42. Similarly, by including a second sensor (not shown) orthogonally positioned with respect to beam 42 and sensor 46, and by using reflector 55, the biaxial tilt or rotation of reflector 55 with respect to the axis of beam 42 as well as the biaxial displacement of reflector 55 in a plane perpendicular to the axis of beam 42 may be sensed.

In operation, means 10 for producing the multipolarized light beam in the system of FIGURE 1 or multi-polarizing element 22 in the system of FIGURE 2 is mounted on one body and the analyzing means 12 for polarization analyzer 24 is mounted on a second body. Either body may be displaceable with respect to the other. The beam of multi-polarized light is aligned with the analyzer 12 or 24 to produce a null point; that is, each polarization is sensed at the same level of density. When the beam is displaced with respect to the analyzer 12 or 24, a greater intensity of one polarization than the other is sensed and the generated signals are utilized for recording or monitoring purposes.

The difference in intensity is a linear analog of the difference between the amounts of each polarization pair sensed. The magnitude of this difference is the magnitude of displacement, and the electrical polarity indicates the direction of the displacement. In order to make the difference in areas sensed in a linear analog of displacement, it is necessary to maintain the light beam in a rectangular cross-section so that the areas are bounded by sides which are perpendicular to the dividing lines. For small displacements, a circle does not introduce noticeable non-linearity. The present invention may sense displacements of up to about ¼ the diameter of the objective with an accuracy of better than one mil. The signals generated by the analyzer are then used to record or monitor displacement changes of one body with respect to the other.

It is apparent that the described examples are capable of many variations and modifications. All such variations and modifications are to be included within the scope of the present invention.

What is claimed is:

1. A device for sensing displacement between two bodies relative to a base line extending between said bodies comprising:
    (a) a light source mounted on one body, said light source including polarizing means for producing a beam of polarized light having at least two sharply divided polarized beam sectors with distinctly different polarization characteristics,
    (b) an analyser for mounting on the other of said bodies to be aligned with said one body, said analyser comprising a first polarizing screen element having at least four sharply divided sector areas, each sharply divided sector area having distinctly different polarization characteristics, said first screen element being substantially aligned with the beam of polarized light so the beam of polarized light is directed onto one of the sharply divided sector areas of said first screen element, a second polarizing screen element on said analyser for the passage of plane polarized light, said second screen element being in optical alignment with said first screen element for passing light polarized in one plane, said first screen element being mounted for stepwise movement for moving each of the light passing sector areas so the beam of polarized light may impinge successively on each one of said sharply divided sector areas of said first screen element, said second screen element being mounted for stepwise movement at each second step of movement of said first screen element a sufficient amount of movement to provide a distinctly different polarization characteristic to the passage of plane polarized light from said first screen element with each stepwise movement of said second screen element, a photocell in optical alignment with the screen elements and adapted to receive and to measure the intensity of the beam of polarized light passing through the first and second screen elements, and electronic means for indicating the displacement and the direction of displacement electronically by the signal produced from said photocell.

2. A device for sensing displacement between two bodies relative to a base line extending between said bodies comprising:
    (a) means associated with the first of said bodies for projecting a beam of collimated light parallel to said base line,
    (b) reflecting means associated with the second of said bodies and disposed to receive and reflect the beam of light projected as aforesaid, said reflecting means comprising a plurality of light polarizing sectors, each of said sectors having distinctly different polarization characteristics thereby to divide a reflected beam of light into a plurality of beam sectors of distinctly different polarization characteristics;
    (c) monitoring means disposed on said first body to receive said reflected sectored beam of polarized light, said monitoring means comprising:
        (1) a first light transmissive screen element in the optical return path of said beam of polarized light, said first screen element including at least four light polarizing sector areas, said first screen element being substantially aligned with said beam of polarized light from said reflector and being mounted for stepwise movement for moving each of the light passing sector areas of said first screen element to place one of said light passing sector areas in the path of said beam of polarized light;
        (2) a second plane polarizing light transmissive screen element disposed to receive said beam of polarized light passing through said first screen element, said second screen element being mounted for stepwise movement at each second step of movement of said first screen element a sufficient amount of movement to provide a distinctly different characteristic by the passage of plane polarized light from said first screen element, a photocell in optical alignment with the screen elements and adapted to receive and to measure the intensity of the beam passing through the first and second screen elements, and electronic means for indicating the displacement and the direction of displacement electronically by the signal produced from said photocell.

3. The invention according to claim 1 in which the screens are mounted for rotational movement.

4. The invention according to claim 1 in which the light source including polarizing means produces sharply divided beam sectors of right circularly polarized light, left circularly polarized light, first plane polarized light, and second plane polarized light perpendicular to said first plane polarized light.

5. The invention according to claim 2 in which the screens are mounted for rotational movement.

6. The invention according to claim 2 in which means are provided to determine bi-axial rotation of one body about perpendicular axes orthognal to the beam of light.

7. The invention according to claim 2 in which the means for projecting a beam of collimated light and the reflecting means produces sharply divided beam sectors of right circularly polarized light, left circularly polarized light, first plane polarized light, and second plane polarized light perpendicular to said first plane polarized light.

References Cited

UNITED STATES PATENTS

| 3,031,919 | 5/1962 | Collyer | 88—14 |
| 3,220,113 | 11/1965 | Geier et al. | 88—14 X |
| 3,230,820 | 1/1966 | Wisnieff | 88—14 |
| 3,270,612 | 11/1966 | Collyer | 88—14 |

JEWELL H. PEDERSEN, *Primary Examiner.*

A. A. KASHINSKI, *Assistant Examiner.*